Patented Mar. 5, 1946

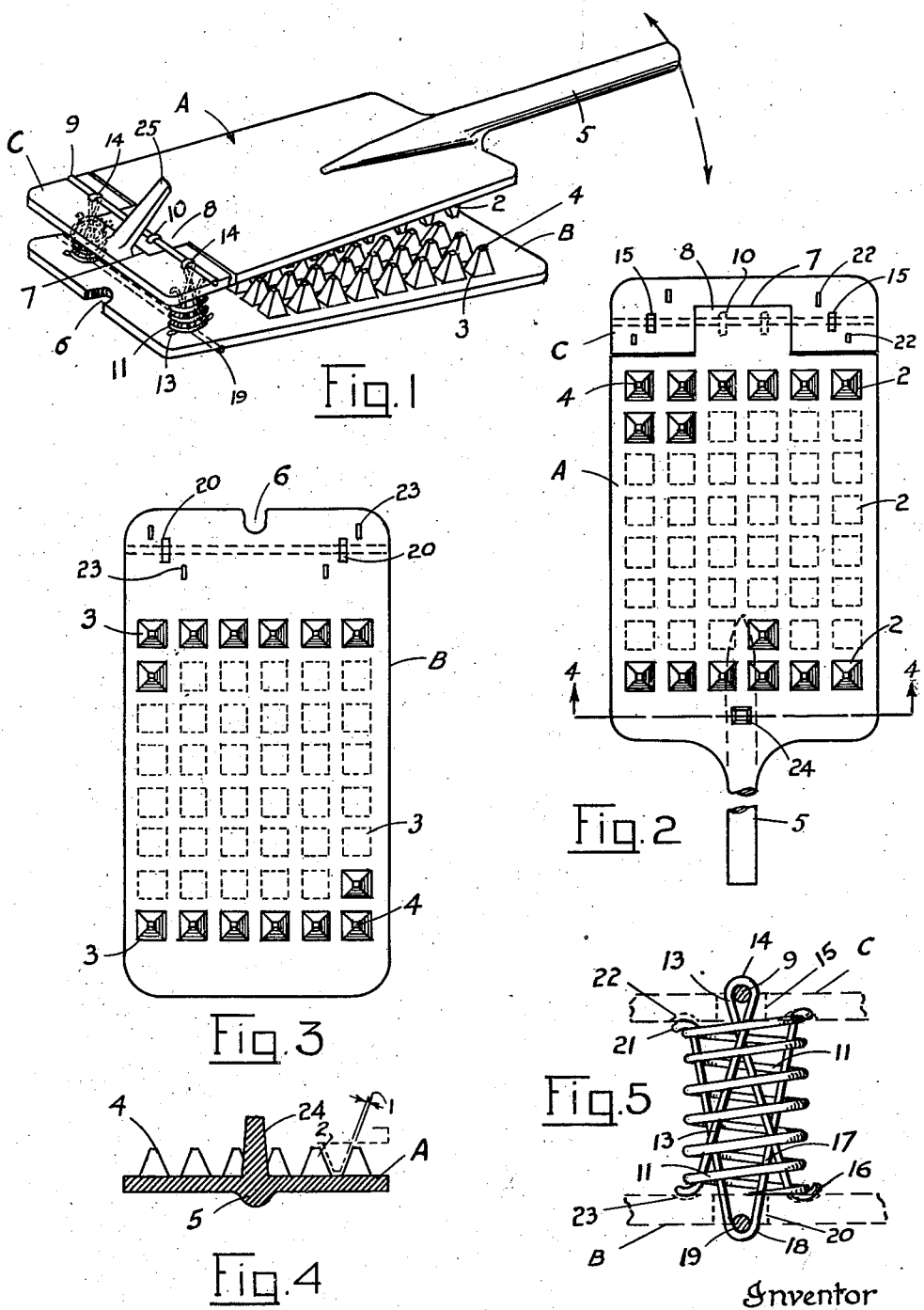

2,396,020

UNITED STATES PATENT OFFICE 2,396,020

MEAT PERFORATOR

Francis Philip Savage, Calgary, Alberta, Canada

Application November 24, 1944, Serial No. 564,995
In Canada September 5, 1944

2 Claims. (Cl. 17—30)

My invention relates to an apparatus for use in the tenderising of meat for human consumption, and is of such a form that the tenderising is attained by so disrupting the cellular structure of the meat by actually perforating, and in the same process, so crushing the meat by mechanical means as to render it more readily subject to mastication. During this herein described process the meat is subjected to pressure which perforates it under the action of certain projecting sets of teeth, and which action is accompanied by a crushing action to render it more ready for digestion, and consequently more healthful to the individual adding more poignancy to the matter of eating.

The ease of handling and operating the device, together with its constructional simplicity are matters of considerable advantage to both purchaser and manufacturer.

I attain the objects outlined by the apparatus illustrated in the accompanying drawing, in which:

Fig. 1 is a perspective view of the device showing the pathway of closure.

Fig. 2 is an underside view of the upper plate, in part detail, with the stabilizer hinged plate.

Fig. 3 is a plan view of the lower plate in part detail.

Fig. 4 is a cross section on line 4—4 of Fig. 2.

Fig. 5 shows details of crossed spring holders for hinge pins and helical spacing spring.

Similar numerals refer to similar parts throughout the several views.

A represents an upper movable meat crushing plate having a plurality of pyramoidally shaped projecting teeth protruding from its under face and spaced in rectangular manner at equal distances apart on the said face. B represents a lower stationary meat-reception block having a plurality of pyramoidally shaped projecting teeth protruding upwardly from its upper face and arranged in relative uniformity on the said upper face, and so disposed relatively to the said projecting teeth of the upper plate as to fit into the spaces between the same, leaving, on closure of the two said upper and lower elements A and B, a clearance I between these teeth.

The teeth 2 on plate A as well as the teeth 3 on block B are, as stated, of pyramidoidal shape, but, are truncated as shown at 4 in order to puncture the meat with larger perforations than would be the case if the teeth were sharp pointed.

A handle 5 extends from one end of the upper plate A, and the base block B has an indenture 6 at its end furthest from the operator for reception of a headed bolt or convenient stop in the table on which the apparatus should rest. A stabilizer member C is recessed at 7 to accommodate a projecting lip 8 on the upper plate A at the fulcrum end of the said upper plate, and a pin 9 is embedded transversely within the top face of each of the said plate and said stabilizer elements. This pin is bearably held in place by holding down staples 10 to hinge the said plate and stabilizer in coactive relationship.

The teeth 2 in the upper plate A interlock with the teeth 3 of the lower base block B when the former is closed down on the latter through its hinged attachment to the said stabilizer C. Two helical springs 11 separate stabilizer from base block and act as a means of springably maintaining such separation. These springs 11 are the means of separating the teeth in readiness for and during meat pounding operations, and in order to effect a connection between the springs, stabilizer and lower block, a pair of spring holders are adaptedly disposed to compress each spring, one spring holder 13 is looped around the said pin 9, each holder loop 14 passing through a slotted aperture 15 in the stabilizer for this purpose. The two ends of this spring holder 13 are hooked at 16 to engage the lower end of one spring 11. The other spring holder 17 is V-shaped and is anchored at its apex 18 to a transversely disposed pin 19 embedded in the under face of the base block B passing through the slotted apertures 20 in the block for this purpose, and its two ends are hooked at 21 to engage the upper end of the one spring 11. By this arrangement each of the two springs 11 is compressed as the handle 5 is lowered through the pull of each holder 13 and 17 against one another in each spring combination.

The under face of the stabilizer C and the upper face of block B are gouged out at 22 and 23 to receive the hooked ends 21 and 16 respectively of the springs 11. A stop 24 projects from the lower face of the upper plate A at the root of the handle 5 to contact the base block B, and is of such a length as to prevent the truncated end of each tooth from actual contact with upper and lower members. A stop 25 projects upwardly from the stabilizer member C as a means of limiting the degree of angular separation of the upper plate A and the lower block B.

The object of the stabilizer C is to maintain a springable stability between the upper and lower elements of this device during the meat perforating and pounding operations, when a more rigid hinge combination would not be flexible enough.

I claim:

1. Meat perforating apparatus as described, comprising in combination, an upper hingedly movable plate, meat perforating teeth of truncated pyramid shape projecting downwardly from a portion of said plate, a lower stationary base block, meat perforating teeth of truncated pyramid shape projecting upwardly from said base block and interlocking with and spaced from said plate teeth, a handle integral with said upper plate for use in compressing, perforating, and pounding meat between said upper plate and said lower base block teeth, a stabilizer or hinge plate to which said upper plate is hingedly connected, a hinge pin pivotally connecting said upper plate element with said stabilizer element, helical compression springs between said upper stabilizer element and said base block, spring holders depending from said hinge pin and supporting said springs at their lower ends, a transverse anchor pin under said base block, and spring holders anchored on said anchor pin and bearing on the top ends of said helical springs, each duplex set of said spring holders compressing each said helical spring on separation of the two cooperating spring holders from one another in a longitudinal direction on the downward pressure of said handle.

2. The combination, in a meat perforating device, of a swingable upper plate and a stationary lower base block cooperating together for the perforation and pounding of the meat, pointed perforator teeth projecting downwardly from said upper plate and upwardly from said lower base block and meshing together, a handle integral with said upper plate for such meshing action, a stabilizing hinge plate at the fulcrum end of said upper plate to which said upper plate is hingedly connected, a hinge pin for coupling said stabilizing plate with said upper plate, a stop member projecting from said upper plate to maintain proper distance between said upper plate and base block, a stop rest on said stabilizing plate to limit the upward angular movement of said upper plate, stabilizing springs between said stabilizer plate and said lower block, holders for said springs connecting their bottom ends with said hinge pin and their top ends with an anchor pin in said base block, means to secure said upper and lower pins in position, and an indentation in said lower block adapted to receive a stop element to prevent sliding of the device.

FRANCIS PHILIP SAVAGE.